Patented Feb. 20, 1923.

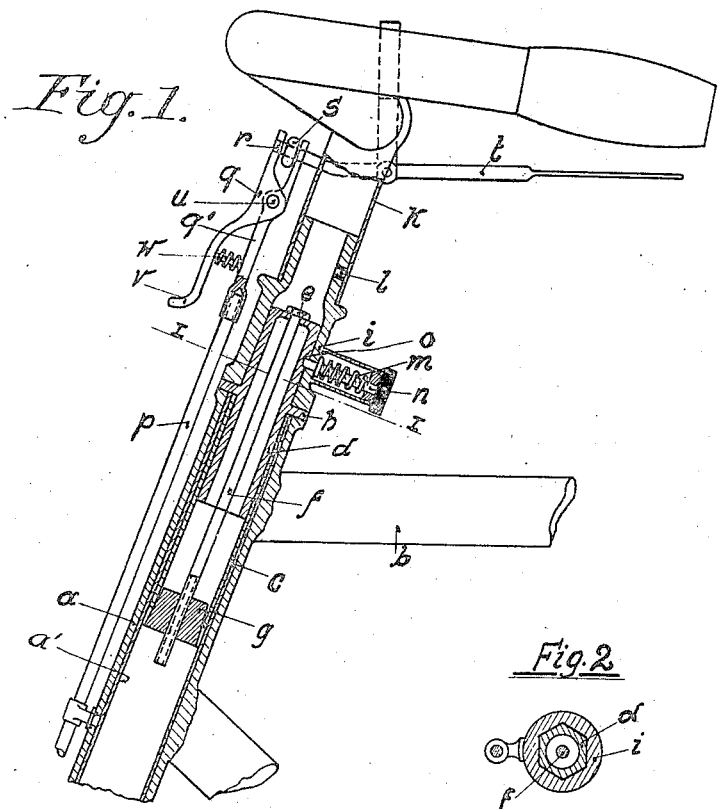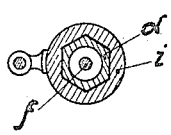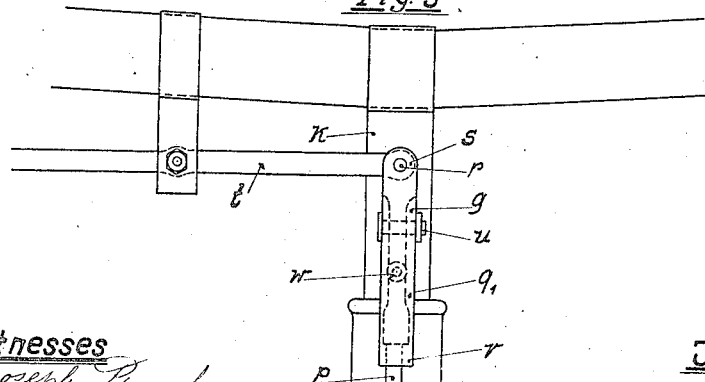

1,446,430

UNITED STATES PATENT OFFICE.

FRANZ ORCHOWSKI, OF BREMEN, GERMANY.

HANDLE BAR FOR BICYCLES.

Application filed January 13, 1922. Serial No. 529,073.

*To all whom it may concern:*

Be it known that I, FRANZ ORCHOWSKI, a citizen of Germany, residing at Bremen, Germany, have invented certain new and useful Improvements in Handle Bars for Bicycles, of which the following is a specification.

The present invention relates to detachable handle bars for bicycles, the object being to prevent theft of the bicycle. Detachable handle bars as such are known, according to which the bar may be removed after loosening the lock nut, but such bars have the serious disadvantage that any other bar might easily be fitted on the bicycle by an intended thief and the bicycle then ridden off.

In the improvement as presented hereinafter, this defect is overcome by fitting a specially-designed coupling device on the upper end of the frame tube which encloses the stem of the front or steering fork. The handle bar has connected to its usual depending stem a socket member which fits conformably over the projecting upper portion of the coupler when the handle bar is in place. The aforesaid projecting portion is given a special shape and, hence, only a handle bar having a socket conforming to that particular shape can be used; and while the handle bar may be readily detached from the steering post, means are preferably provided to prevent such detachment from taking place accidentally.

Other and further improved features are also comprised in the invention, and will become apparent as the description proceeds.

An embodiment of the invention is illustrated by way of example in the accompanying drawings, in which:

Figure 1 is a longitudinal section through the improved bar.

Fig. 2 is a cross-section on line I—I of Fig. 1.

Fig. 3 is a front view showing the mounting of the brake lever.

Referring more particularly to the drawings, $a$ indicates the tubular front member of the frame $b$ wherein the stem $a'$ of the steering fork is rotatably fitted as usual. In the upper portion of said stem is secured a sleeve or tube $c$ which may be regarded as the lower member of the handle bar post, and this sleeve or tube $c$ is connected to the hereinafter-described upper member of the post by means of a hollow coupler $d$ provided with a central flange or collar $h$. The lower part of the coupler fits within tube $c$, and the collar $h$ rests on the upper ends of tubes $c$ and $a$ and thus acts as a stop; the upper part of the coupler projecting above said tube ends and having bearing against it the head $e$ of a fastening bolt $f$, the threaded lower portion of which is engaged with a nut $g$ and forces the same into the open lower end of tube $c$, thereby securing the latter and the coupler together.

The projecting upper part of the coupler fits conformably within a socket member $i$; and the upper part of this member $i$ fits, in turn, within a depending stem $k$ on the handle bar and is secured thereto by a screw $l$ or the like. The two parts $k$ and $i$ conjointly form the upper member of the post; and to enable both members to turn in unison when the handle bar is turned, the socket and the projecting upper part of the coupler are given a polygonal, oval or other suitable non-circular shape, or may be detachably fastened together in any other desired way.

It will be understood from the foregoing that the handle bar, and with it the upper member of the post, may be readily removed from the bicycle; but when that has been done, the upper part of the coupler will be left projecting above tube $a$ and, because of its special shape, will prevent another handle bar from being attached and the bicycle then ridden away. It is preferable, however, to employ a device for preventing accidental removal of the handle bar; and to that end, the socket member $i$ may be furnished with a locking pin $n$ which is subjected to the action of a spring $m$ acting to force its inner end through a lateral opening in the wall of the socket member into a hole or recess $o$ in the wall of the coupler, said pin being disposed within a suitable casing and provided at its outer end with an operating head or cap.

To enable the brake lever $t$ to be readily and quickly detached when using a handle bar of the type above described, the brake rod $p$ may carry at its upper end a clamping member $q$ provided with a pin $r$ for engagement in the terminal eye $s$ of lever $t$. This clamp $q$ preferably takes the form of a lever having a suitable operating portion or handle $v$ and pivoted on a pin $u$ set into a removable arm $q'$ which is threaded on rod $p$ and forms an extension thereof; and said arm comprises a portion which is disposed opposite the pin-carrying portion of lever $q$ and which is formed with an aperture to receive the end of the pin, so that the brake rod and brake lever are thus normally connected for movement in unison, but are disconnected when lever handle $v$ is pressed inward against the action of spring $w$. The eye $s$ of the brake lever can then be readily disengaged from pin $r$, after which the entire handle bar may be lifted off at once.

I claim as my invention:—

1. A handle bar having a post comprising separate upper and lower members, the latter of which is adapted to be permanently secured in the upper portion of the stem of the steering fork, and a coupler detachably connecting said members together; said coupler permanently secured in the lower post member and projecting upwardly beyond the same, and the upper post member embodying a socket in which the projecting portion of the coupler conformably and removably fits, so as to transmit the turning movement of the handle bar and upper post member through the coupler to the lower post member and thence to the steering fork, and to permit the free detachment of said handle bar and upper post member from the projecting portion of the coupler, leaving the said projecting portion standing; said coupler portion and said socket having a special cross-sectional shape to prevent the attachment of a handle bar having a socket of different shape.

2. A handle bar having a post comprising separate upper and lower members, the latter of which is adapted to be permanently secured in the upper portion of the stem of the steering fork, and a coupler detachably connecting said members together; said coupler permanently secured in the lower post member and projecting upwardly beyond the same, and the upper post member embodying a socket in which the projecting portion of the coupler conformably and removably fits; said projecting portion and said socket being provided with coacting means for transmitting the turning movement of the handle bar and upper post member through the coupler to the lower post member and thence to the steering fork, and for enabling the free detachment of said handle bar and upper post member from the projecting portion of the coupler, leaving the projecting portion standing.

3. A handle bar having a post comprising separate upper and lower members, the latter of which is adapted to be permanently secured in the upper portion of the stem of the steering fork, and a coupler detachably connecting said members together; said coupler permanently secured in the lower post member and projecting upwardly beyond the same, and the upper post member embodying a socket in which the projecting portion of the coupler conformably and removably fits; said projecting portion and said socket being provided with coacting means for transmitting the turning movement of the handle bar and upper post member through the coupler to the lower post member and thence to the steering fork, and for enabling the free detachment of said handle bar and upper post member from the projecting portion of the coupler, leaving the projecting portion standing; and a locking device carried by said socket and normally engaged with said projecting portion to prevent removal of the latter from the former.

4. A handle bar having a post comprising separate upper and lower members, the latter of which is adapted to be secured in the upper portion of the stem of the steering fork, and a coupler detachably connecting said members together; said coupler secured in the lower post member and projecting upwardly beyond the same, and the upper post member embodying a socket in which the projecting portion of the coupler conformably and removably fits; said projecting portion and said socket being provided with coacting means for transmitting the turning movement of the handle bar and upper post member through the coupler to the lower post member and thence to the steering fork, and for enabling the detachment of said handle bar and upper post member from the lower member, leaving the projecting portion of the coupler standing; and a spring-pressed locking pin carried by said socket and normally engaged in a recess in said projecting portion to prevent removal of the projecting portion from the socket.

5. In a handle bar, the combination of a post comprising separate upper and lower members, the latter of which is adapted to fit in the upper portion of the stem of the steering fork; a coupler detachably connecting the two post members together and having its lower portion inserted in the lower post member, and its upper portion projecting above that member; and a device for simultaneously securing said lower post member in said steering fork stem, and said lower coupler portion in the lower post member, but free of connection with the upper post member; said upper post member embodying a socket in which the projecting upper portion of the coupler conformably and removably fits, so as to transmit the turning movement of the handle bar and upper post member through the coupler to the lower post member and thence to the steering fork, and to permit the detachment of the handle bar and upper post member from the projecting portion of the coupler, leaving the said projecting portion standing; said projecting coupler portion and said socket having a special cross-sectional shape to prevent the attachment of a handle bar having a socket of different shape.

6. In a handle bar, the combination of a post comprising separate upper and lower members, the latter of which is adapted to fit in the upper portion of the stem of the steering fork; a coupler detachably connecting the two post members together and having its lower portion inserted in the lower post member, and its upper portion projecting above that member; a fastening bolt having a head which bears directly upon the top of the projecting portion of the coupler and a threaded lower portion which extends through the lower portion of the coupler into the lower post member; and a nut engaged with the threaded portion of said bolt for expanding said lower post member and thereby permanently securing it in said steering fork stem; the upper post member embodying a socket in which the projecting upper portion of the coupler conformably and removably fits, so as to transmit the turning movement of the handle bar and upper post member through the coupler to the lower post member and thence to the steering fork, and to permit the detachment of the handle bar and upper post member from the projecting portion of the coupler, leaving the said projecting portion standing; said projecting coupler portion and said socket having a special cross-sectional shape to prevent the attachment of a handle bar having a socket of different shape.

In testimony whereof I have affixed my signature.

FRANZ ORCHOWSKI.